(12) United States Patent
Nalwa

(10) Patent No.: US 6,356,397 B1
(45) Date of Patent: *Mar. 12, 2002

(54) PANORAMIC VIEWING SYSTEM WITH SHADES

(75) Inventor: Vishvjit Singh Nalwa, Middletown, NJ (US)

(73) Assignee: FullView, Inc., Holmdel, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/431,400

(22) Filed: Dec. 27, 1999

Related U.S. Application Data

(63) Continuation of application No. 08/946,443, filed on Oct. 7, 1997, now Pat. No. 6,111,702, which is a continuation-in-part of application No. 08/565,501, filed on Nov. 30, 1995, now Pat. No. 6,115,176.

(51) Int. Cl.[7] .......................... G02B 23/08; G03B 37/04
(52) U.S. Cl. ................. 359/725; 359/402; 359/363
(58) Field of Search ................ 359/367, 399, 359/402, 403, 725, 726, 730, 831–837; 348/36–39; 353/30, 94, 98–99; 352/69–71

(56) References Cited

U.S. PATENT DOCUMENTS

| | | | |
|---|---|---|---|
| 2,267,813 A | 12/1941 | Buckner | 250/141 |
| 2,304,434 A | 12/1942 | Ayres | 88/24 |
| 3,144,806 A | 8/1964 | Smith | 88/16.6 |
| 3,286,590 A | 11/1966 | Brueggemann | 88/24 |
| 3,420,605 A | 1/1969 | Kipping | 352/69 |
| 3,506,344 A | 4/1970 | Petit, Jr. | 352/69 |
| 3,740,469 A | 6/1973 | Herndon | 178/6.8 |
| 3,998,532 A | 12/1976 | Dykes | 352/69 |
| 4,078,860 A | 3/1978 | Globus et al. | 352/69 |
| 4,355,328 A | 10/1982 | Kulik | 358/87 |
| 4,357,081 A | 11/1982 | Moddemeijer | 352/69 |
| 4,429,957 A | 2/1984 | King | 359/725 |
| 4,589,030 A | 5/1986 | Kley | 358/225 |
| 4,859,046 A | 8/1989 | Traynor et al. | 359/838 |
| 4,890,314 A | 12/1989 | Judd et al. | 379/53 |
| 4,982,092 A | 1/1991 | Johle | 250/332 |
| 4,985,762 A | 1/1991 | Smith | 358/87 |
| 5,016,109 A | 5/1991 | Gaylord | 358/225 |
| 5,023,725 A | 6/1991 | McCutchen | 358/231 |
| 5,030,823 A | 7/1991 | Obdeijn | 250/223 |
| 5,040,055 A | 8/1991 | Smith | 358/87 |
| 5,130,794 A | 7/1992 | Ritchey | 358/87 |
| 5,179,440 A | 1/1993 | Loban et al. | 358/87 |
| 5,187,571 A | 2/1993 | Bruan et al. | 358/85 |
| 5,194,959 A | 3/1993 | Kaneko et al. | 358/225 |
| 5,236,199 A | 8/1993 | Thompson, Jr. | 273/439 |
| 5,245,175 A | 9/1993 | Inabata | 250/201 |
| 5,264,881 A | 11/1993 | Brooke | 353/94 |
| 5,264,945 A | 11/1993 | Kannegundla | 358/444 |
| 5,305,029 A | 4/1994 | Yoshida et al. | 353/37 |
| 5,452,135 A | 9/1995 | Maki et al. | 359/834 |

(List continued on next page.)

OTHER PUBLICATIONS

WO 92 14341 A, Aug. 20, 1992, p. 8, on line 26—p. 16, line 9, D. Braun et al., Translation yes.

DE–C–37 39 697, Dec. 8, 1988, col. 1—col. 2, Translation No.

(List continued on next page.)

*Primary Examiner*—Thong Nguyen
(74) *Attorney, Agent, or Firm*—Christopher N. Malvone

(57) ABSTRACT

Cameras are positioned so that they each view a different reflective surface of a polyhedron such as a pyramid. This results in each camera having a virtual optical center positioned within the pyramid. The cameras are positioned so that their virtual optical centers are offset from each other. The offsets produce narrow blind regions that remove image distortions received from the edges of the pyramid's reflective surfaces. Additionally, planar shades that extend in an outward direction are positioned in the blind regions.

10 Claims, 8 Drawing Sheets

U.S. PATENT DOCUMENTS

| | | | | |
|---|---|---|---|---|
| 5,495,576 | A | 2/1996 | Ritchey | 395/125 |
| 5,526,133 | A | 6/1996 | Paff | 358/335 |
| 5,539,483 | A | 7/1996 | Nalwa | 353/94 |
| 5,619,255 | A | 4/1997 | Booth | 348/36 |
| 5,684,626 | A | 11/1997 | Greenberg | 359/388 |
| 5,708,469 | A | 1/1998 | Hersberg | 348/39 |
| 5,745,305 | A | 4/1998 | Nalwa | 359/725 |
| 6,111,702 | A * | 8/2000 | Nalwa | 359/725 |

OTHER PUBLICATIONS

EP–A–0 484 801 A3, May 13, 1992, col. 7, line 4—line 16, Figure 3, V. Lazarev, Translation yes.

EP–A–0 519 774, Dec. 23, 1992; col. 4, line 51—col. 5, line 49, Figure 1.7, example 4, K. Uehira, Translation yes.

WO–A–93 25927, Dec. 23, 1993, p. 13, line 17—p. 14, line 34; Figure 20, B. Remy et al, Translation No.

JA–1985–02, 60–20692(A), Feb. 1, 1985, T. Iwamato, Translation No.

1,528,819, France, Translation No.

1,206,316, Feb. 9, 1960, France, Smith et al., Translation No.

EP–0 552 204, Jan. 13, 1993, Europe, col. 12, line 56—col. 39, line 7, D. McCutchen, Translation yes.

WO 97/43854 A, Nov. 20, 1997, S. Nayer. Translation: yes.

EP–0 793 074 A1, Sep. 3, 1997, Europe, abstract, J. van-Roekel. Translation No.

IEICE Transaction on Communications, vol. E77–B, No. 2, Feb. 1, 1994, pp. 232–238, XP000447116, Kazutake Uehira et al., "Seamless Image–Connection Technique For A Multiple–Sensor Camera," p. 233, col. 1, line 19—p. 234, col. 1, line 14.

"Omnidirectional Imaging with Hyperboloidal Projection," by K. Yamazawa, et al, .us 1993 IEEE Intern'l Conference, Yokohama, Japan, Jul. 26–30, 1993, pp. 1029–1034.

Derwent Publication on DE 3930–744–A, "Projector for video colour picture."

"Panoramic Optics Give U.S. Tankers A Better Than Bird-seye View," by D. Rees and M. Lisic, Industrial Photograpy, Apr. 1963, pp. 36, 37, and 69.

Starchild: Galaxies, XP002124075, Internet: URL:http://starchild.gsfc.nasa.gov/...w/universe levell/galaxies.htlm.

* cited by examiner

PANORAMIC VIEWING SYSTEM WITH SHADES

CROSS REFERENCE TO RELATED INVENTION

This application is a continuation of commonly assigned U.S. patent application entitled "Panoramic Viewing System With Offset Virtual Optical Centers", Ser. No. 08/946,443, filed Oct. 7, 1997, now U.S. Pat. No. 6,111,702, which is a continuation-in-part of commonly assigned U.S. patent application entitled "Spherical Viewing/Projection Apparatus", Ser. No. 08/565,501, filed Nov. 30, 1995, now U.S. Pat. No. 6,115,176, and is related to commonly assigned U.S. patent application entitled "Panoramic Viewing Apparatus", Ser. No. 08/431,356, which issued as U.S. Pat. No. 5,745,305 on Apr. 28, 1998.

BACKGROUND OF THE INVENTION

1. Field of the Invention

The present invention relates to a viewing system; more particularly, a spherical viewing system.

2. Description of the Related Art

In an effort to operate more efficiently, it is desirable to perform some tasks using telepresence. Telepresence refers to providing visual or other types of sensory information from a device at a remote site to a user that makes the user feel as if he/she is present at the remote site. For example, many businesses now hold meetings using telepresence. Telepresence is also useful for distance learning and remote viewing of events such as concerts and sporting events. A more realistic telepresence is provided to a user by providing the user with the capability to switch between views, and thereby mimic, for example, looking around a meeting room.

In the past, when several views were made available to a user, several cameras with different optical centers were used. Such a situation is illustrated in FIG. 1. FIG. 1 illustrates cameras 2, 4, 6 and 8 with optical centers 10, 12, 14, and 16, respectively. When the user decided to change views, he or she simply switched between cameras. In more sophisticated systems, when a user decided to change views, he or she was able to obtain a view from optical centers 10, 12, 14, or 16 as well as from additional optical centers 18, 20, 22, 24 or 26. Views associated with optical centers such as 18, 20, 22, 24, and 26 were obtained by using views from the two cameras nearest to the selected optical center. For example, a view from optical center 18 was obtained by using the views from forming these interpolated views required a large amount of computational power and time, and thereby made this technique expensive and slow to respond to a user's commands. This computational overhead also limited the number of users that can simultaneously use the system.

SUMMARY OF THE INVENTION

One embodiment of the present invention provides an omnidirectional or panoramic viewer where several cameras have a common optical center. The cameras are positioned so that they each view a different reflective surface of a polyhedron such as a pyramid. This results in each camera having a virtual optical center positioned within the pyramid. The field of view of each of the cameras is merged with the individual fields of view of the other cameras and arranged to form a composite field of view which is a continuous 360 degree view of an area when taken as a whole. The user can sweep through 360 degrees of viewing, where each view has the same or nearly the same optical center, by simply using the output of one camera or the combination of two cameras without requiring the computational overhead of interpolation used in the prior art. Such an arrangement may be used to enhance use of virtual meeting rooms by allowing a viewer to see the meeting room in a more natural format. This format corresponds closely to a person sitting in the actual meeting who simply turns his or her head to change the view at a particular time.

In another embodiment of the present invention, a nearly spherical view is provided to a user by placing a camera with its optical center at the common virtual optical center of the viewer. In order to enhance the spherical view, the camera at the common virtual optical center may use a wide angle lens.

In still another embodiment of the invention, the cameras are positioned so that their effective optical centers are offset from each other. The offsets produce narrow blind regions that remove image distortions received from the edges of the pyramid's reflective surfaces. Additionally, planar shades that extend in an outward direction are positioned in the blind regions.

In yet another embodiment of the present invention, the viewing device may include any type of image transducer or processing device. If the image processing device is a camera or other type of image capture device, a panoramic or spherical image is captured for the user, and if the image processing device is a projector or other type of image producing device, a panoramic or spherical image is produced for the user.

DESCRIPTION OF THE PREFERRED EMBODIMENT

Figure 1:
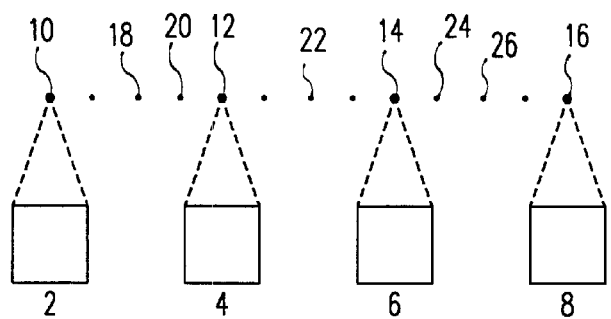
FIG. 1 illustrates a prior art multiple camera viewing system.
Figure 2:
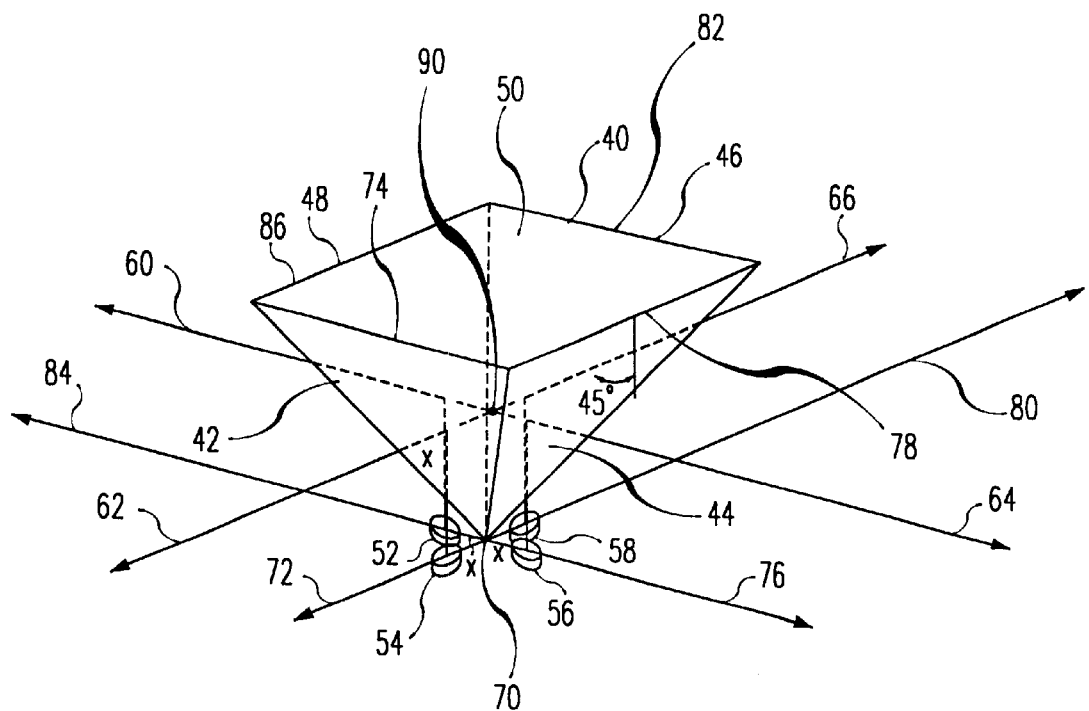
FIG. 2 illustrates a four camera omnidirectional or panoramic viewing system using a four-sided pyramid with reflective surfaces.

FIG. 2 illustrates a four camera system for providing a 360 degree view to a user, where the cameras each have a common virtual optical center within the pyramid. Pyramid 40 has reflective sides 42, 44, 46 and 48 and may be a hollow or solid structure. In a preferred embodiment, each of the reflective sides forms a 45 degree angle with a plane parallel to base 50 and passing through the vertex of pyramid 40. Cameras 52, 54, 56 and 58 are associated with pyramid reflective surfaces 48, 42, 44, and 46, respectively. The cameras may be image gathering devices such as an optical scanner. As a result, camera 52 views a reflection from surface 48 to enable it to view objects in the direction of arrow 60. Camera 54 views a reflection from surface 42 to view objects in the direction of arrow 62. Camera 56 views a reflection from surface 44 to view objects in the direction of arrow 64, and camera 58 views a reflection from surface 46 to view objects in the direction of arrow 66. Each camera has a 90 degree field of view. The combination of the four cameras viewing reflections from their associated reflective surfaces on pyramid 40, produce a 360 degree view of the area surrounding pyramid 40. It is desirable to locate the optical center of each camera on a plane that is parallel to base 50 and intersects vertex 70 of pyramid 40. Each camera's optical center should also be located on a line that passes through vertex 70 and is perpendicular to the base line of the camera's associated reflective surface. For example, the optical center of camera 54 is located on line 72. Line 72 is perpendicular to base line 74 of reflective surface 42. Line 72 is in a plane that passes through vertex 70 and is parallel to base 50. Likewise, the optical center of camera 56 is positioned on line 76 which is perpendicular to baseline 78, the optical center of camera 58 is positioned on line 80 which is perpendicular to base line 82, and the optical center of camera 52 is positioned on base line 84 which is perpendicular to base line 86.

Each camera optical center is positioned on one of the above described lines at a distance X from vertex 70 and each camera has its optical axes or direction of view pointing perpendicular to base 50. (The distance X should be such that the reflective surface reflects as much of the camera's field of view as desired; however, the defects in the reflective surface become more visible when the camera is moved closer to the reflective surface.) This positioning of optical centers results in the cameras sharing a virtual optical center located at position 90. Virtual optical center 90 is located a distance X from the vertex 70 on a line that passes through vertex 70 and is perpendicular to base 50.

Figure 3:
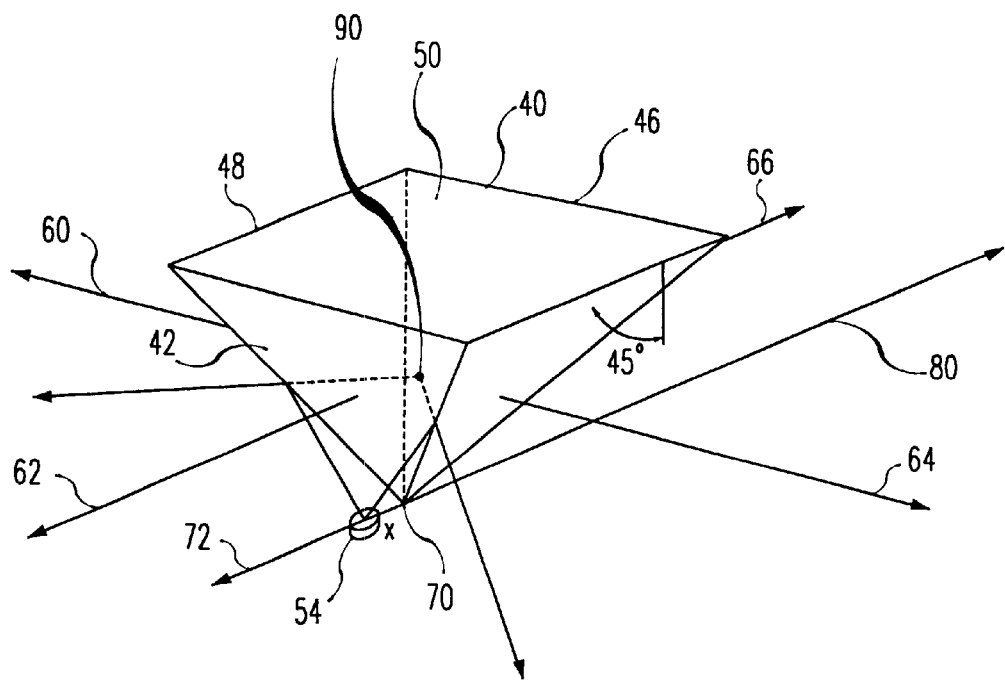
FIG. 3 illustrates how a reflective surface of the pyramid is used to provide each camera with a common optical center.

FIG. 3 illustrates another view of pyramid 40 where only camera 54 is shown for the sake of simplicity. Camera 54 is positioned on line 72 so as to have a virtual object center at position 90 within pyramid 40. If camera 54 has a 90 degree field of view in the direction perpendicular to base 50, and if the optical center of camera 54 is at a distance of X from vertex 70 along line 72, camera 54 has a 90 degree view in the direction of arrow 62. In similar fashion, cameras 56, 58, and 52 have 90 degree views in the direction of arrows 64, 66, and 60, respectively. This arrangement inexpensively produces a 360 degree field of view of an area because cameras with a 90 degree field of view has relatively inexpensive optics.

Figure 4:
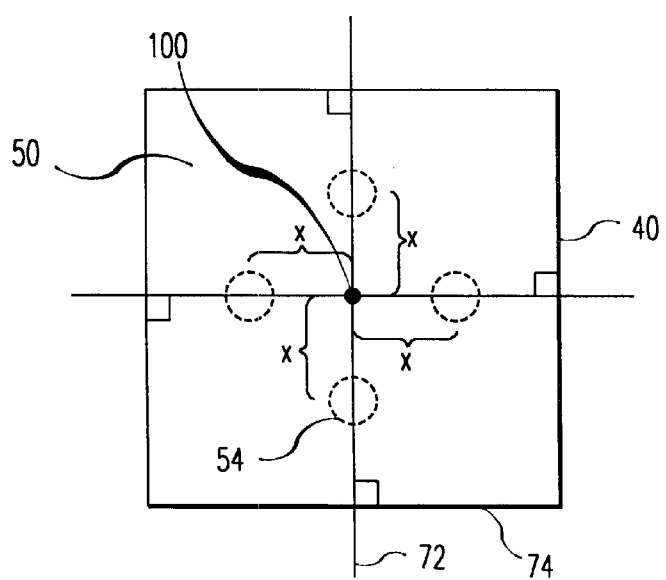
FIG. 4 illustrates the top view of the pyramid illustrating the camera position.

FIG. 4 is a top view of pyramid 40. FIG. 4 illustrates the placement of the optical center of camera 54 along line 72. Line 72 should be in a plane that passes through vertex 70 and is parallel to base 50. The line should also be perpendicular to base line 74 of pyramid 40. The camera's optical center should be positioned a distance X from vertex 70 along line 72. The distance X should be such that the reflective surface reflects as much of the camera's field of view as desired. Point 100 is located on base 50 at a position where a line from vertex 70 perpendicularly intersects base 50. In a similar fashion, the optical centers of cameras 56, 58 and 52 are positioned the distance X along lines 76, 80 and 84, respectively.

Figure 5:
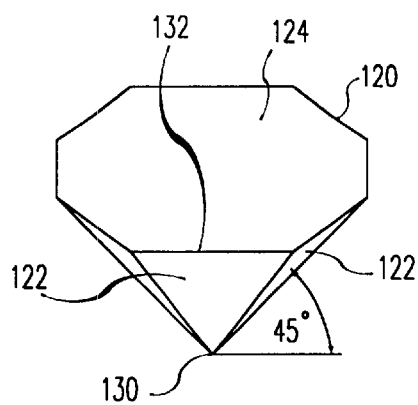
FIG. 5 illustrates an eight-sided pyramid with reflective side surfaces.

FIG. 5 illustrates an eight-sided pyramid 120. Pyramid 120 has reflective surfaces 122 where each of surfaces 122 forms a 45 degree angle with a plane that passes through vertex 130 and is parallel to base 124. As with the four-sided pyramid of FIG. 2, each reflective surface of FIG. 5 may have a camera associated with it. Each camera's optical center is positioned on a line that is in a plane that passes through vertex 130 and is parallel to base 124. The line is perpendicular to base line 132 of the reflective surface associated with the camera to be positioned. Using an eight-sided pyramid offers the advantage of using cameras with only a 45 degree field of view to obtain a 360 degree view. Cameras with only a 45 degree field of view have inexpensive optics and enable a 360 degree view to be constructed using relatively inexpensive components.

Figure 6:
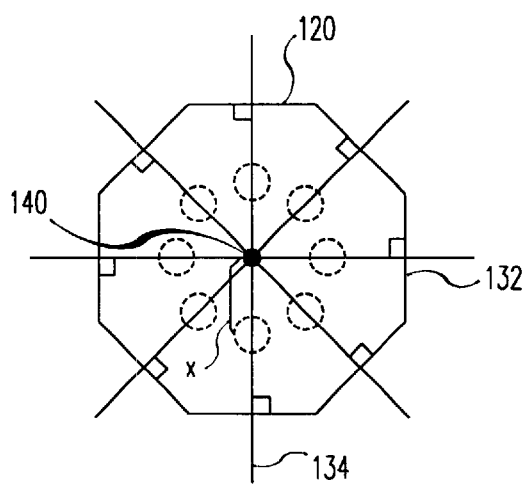
FIG. 6 is a top view of the pyramid of FIG. 5.

FIG. 6 is a top view of pyramid 120. As discussed with regard to FIG. 5, each camera's optical center is positioned along a line 134 which is in a plane that passes through vertex 130 and is parallel to base 124. The optical centers are positioned a distance X along line 134 which is perpendicular to the appropriate base line 132. Point 140 is on base 124 at the point of intersection between base 124 and a line that passes through vertex 130 and is perpendicular to base 124.

Pyramids having more or less reflective sides may be used. The advantage of using pyramids having a larger number of sides is that cameras with moderate to small fields of view may be used. Cameras with moderate fields of view have relatively inexpensive optics. The number of sides used in a pyramid is somewhat limited by the cost of providing a large number of cameras. A 360 degree view of a scene may be provided using a pyramid having three reflective sides. It may be expensive to use only a three-sided pyramid in order to provide a 360 degree field of view. This embodiment of the invention uses three cameras each with a 120 degree field of view, and cameras with such a wide field of view use relatively expensive optical components.

In applications where a full 360 degree view is not desired, it is possible to build a viewer that does not have a camera associated with each reflective surface of the pyramid.

Figure 7:
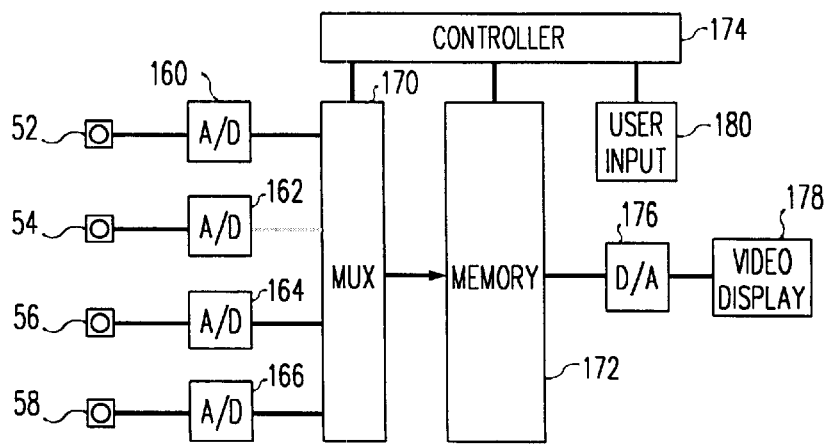
FIG. 7 is a block diagram of a system to control data produced by the cameras.

FIG. 7 illustrates a block diagram of a system for controlling data produced by the cameras of a viewing device such as the viewing device described in FIGS. 2 through 4. Cameras 52, 54, 56 and 58 obtain a 360 degree view of an area via their associated reflective surfaces of pyramid 40. The image signal or output signal of cameras 52, 54, 56 and 58 are passed through analog to digital converters (A/D) 160, 162, 164, and 166, respectively. The output of the cameras can be thought of as a stream of pixels and the output of the A/Ds can be thought of as data representative of the pixels from the cameras. The output of the A/Ds are passed through mux 170. Mux 170 allows the pixel data from each of the A/Ds to reach memory 172. Controllers 174 cycles the select lines of mux 170 so that the outputs of all of the A/Ds are stored in memory 172. Mux 170 is switched at a rate that is four times the pixel rate of the cameras. If more or less cameras are used, the rate at which mux 170 is switched will be increased or slowed accordingly. It is also possible to eliminate mux 170 and to store the output of each A/D in a separate memory. Controller 174 is implemented using a microprocessor which provides control signals to counters that control the switching of mux 170 and counters used to provide addressing to memory 172. The control signals to the counters include reset, enable and a starting offset.

As a result of the pixel information being passed to memory 172, memory 172 contains a 360 degree view of a scene. Pixel information stored in memory 172 is passed through digital to analog converter (D/A) 176 and to video display 178. The actual portion of memory 172 that is passed to video display 178 via D/A 176 is controlled via user input device 180. User input device 180 may be a common device such as a mouse, joystick, or keyboard. The user may simply lean a joystick to the right to shift his view to the right, lean the joystick to the left to shift the view to the left, or leave the joystick in the center to keep the view unchanged. Based on the input from the user device 180, controller 174 varies offsets and starting addresses that are used to provide addressing to memory 172.

Figure 8:
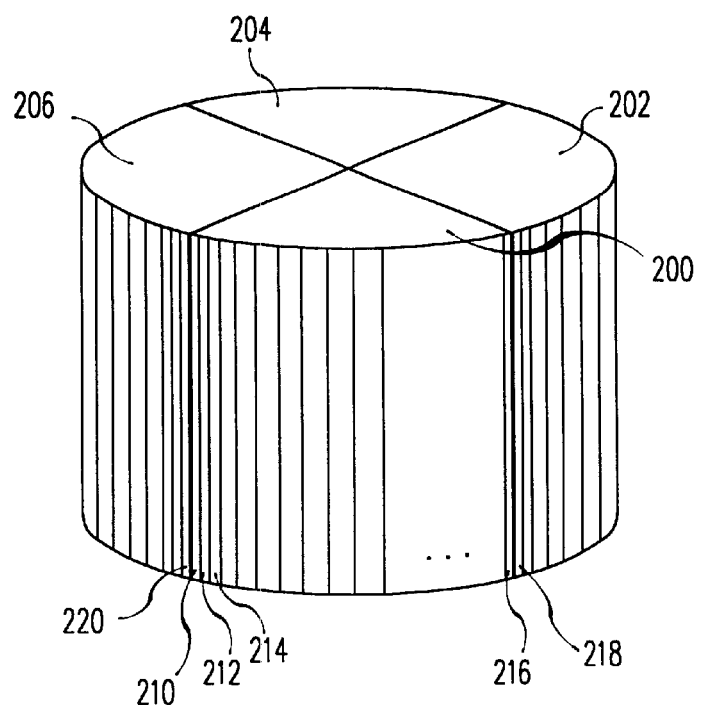
FIG. 8 illustrates the association between the data received from the cameras and the view presented to a user.

FIG. 8 illustrates the relationship between the data provided by the cameras and the view available to the user. Since the cameras share a virtual optical center, the view can be thought of as a cylindrical view. Sector 200 can be thought of as representing the information provided by camera 52, sector 202 can be thought of as representing the information provided by camera 54, sector 204 can be thought of as representing the information provided by camera 56, and sector 206 can be thought of as representing the information provided by camera 58. The surface of the cylinder in each sector can be thought of as a collection of columns, where each column is composed of pixels. For example, sector 200 can be thought of as a collection of columns including columns 210, 212, 214 and 216. Likewise, the output produced by camera 54 can be thought of as a collection of columns which include column 218 in sector 202 and the output of camera 58 can include columns such as column 220 in sector 206. The column of pixels near the sector boundaries are closer together than the columns near the center of a sector. This occurs because the cameras capture the image on a plane while FIG. 8 shows the columns projected onto a cylindrical surface.

Figure 9:
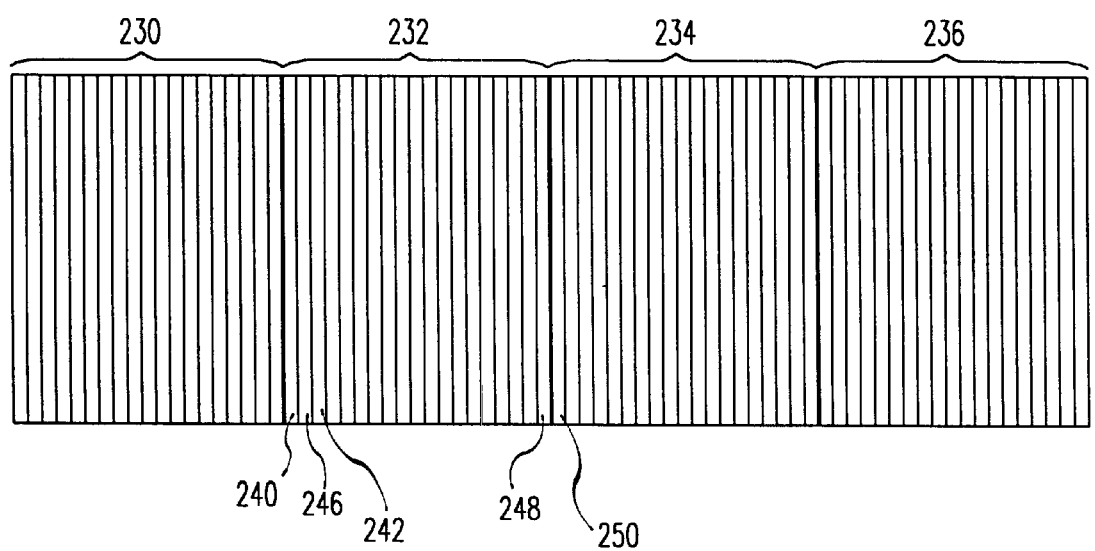
FIG. 9 illustrates an addressing scheme for the memory of FIG. 7.

FIG. 9 illustrates how memory 172 is divided to provide easy access to different views based on signals from user input device 180. Sections 230, 232, 234 and 236 correspond to sectors 206, 200, 202 and 204, respectively. Each of sections 230, 232, 234 and 236 can be thought of as a block within memory 172. The blocks in memory 172 are broken into columns of sequential addresses. The first column of memory segment 230 corresponds to the first column of pixels of sector 202. The number of memory positions associated with a column should be at least sufficient to have one location for each pixel in a particular column. For example, if a column of pixels from FIG. 8 includes 1000 pixels, each column associated with the memory segments of FIG. 9 should have at least 1000 locations. The number of columns associated with a particular memory segment should be at least equal to the number of columns associated with a particular section of the cylinder of FIG. 8.

If a camera scans in a horizontal direction, sequential pixels are written in adjacent columns, but possibly different rows, of a particular memory segment by simply changing an offset to a counter generated address. The overall write address is generated by adding the offset to the counter's output. This offset is changed at the rate in which the horizontally scanned pixels are received. After a horizontal scan is completed, the counter is incremented and once again the offsets are changed at the horizontal scan rate. As a result, when addressing a particular segment of memory during a write cycle, the columns are addressed by changing the offset at the horizontal pixel scan rate, and incrementing the counter at the vertical scan rate. This type of addressing scheme is used for accessing columns within each memory segment. When addressing different memory segments during a write cycle, a write segment offset is added to the sum of the counter output and the column offset. The write segment offset permits addressing memory segments 230, 232, 234, and 236. The segment offset is changed at the same rate as mux 170 is switched.

Pixel data is read from memory 172 in a similar fashion. The sum of a counter output and two sets of offsets are used to generate a read address. Once an initial starting column has been picked, the read address is generated by switching a read column offset at a rate that is equal to the horizontal scan rate of a video display. After reading one horizontal scans worth of data, the read counter is incremented and the read column offsets are changed at a rate equal to the horizontal scan rate of the display. As a result, the offset addresses are changing at the display's horizontal display rate and the counter is incremented at a rate equal to the vertical scan rate of a display. It is possible to read data out at a rate faster or slower than required by the video display; however, if read out faster, a buffer memory should be used, if read out slower the video display may appear choppy to the viewer.

It should be noted that the cylindrical arrangement of pixels of FIG. 8 is typically displayed on a flat or nearly flat display. As a result, the image is displayed by compensating for converting between a cylindrical surface and a flat surface. This may be carried out using a simple conversion algorithm within a common digital signal processing integrated circuit. Methods for these types of conversions are well known in the art and can be found in "A Guided Tour of Computer Vision", Vishvjit S. Nalwa, Addison-Wesley Publishing Co., Reading, Mass., 1993. It is also possible to carry out the conversion using a very high resolution display.

It should be noted that if the view selected by a user corresponds exactly to the view of a particular camera, such as camera 52, columns 240–248 are read from memory 170. Column 240 is the first column in segment 232 and column 248 is the last column in segment 232. If the user decides to move the view in a counter-clockwise direction, the start column will shift to the right so that the read operation begins at column 246 and ends at column 250. It should be noted that column 246 is the second column associated with memory segment 232 which has the pixel data from camera 52, and that column 250 is the first column of pixel data associated with camera 56. As the user shifts the view, the starting column shifts in relationship to the user's commands. For example, if the user indicates that the view should shift in a counter-clockwise direction, the start column of FIG. 9 moves to the right, similarly, if the viewer indicates that the view should shift in a clockwise direction, the start column shifts to the left. As before, columns are addressed by using offsets, if the offsets involve moving between memory segments, a read segment offset is added to the sum of the column offset and counter output.

It should be recalled that the columns near the sector boundaries of FIG. 8 are closer together. As a result, when the user commands a change in a view and when the border of that view is near a sector boundary, the start column changes by a larger number of columns for a given angular rotation of the view. Conversely, when the border of the view is near the center of the sector, the start column changes by a smaller number of columns for a given angular rotation.

Figure 10:
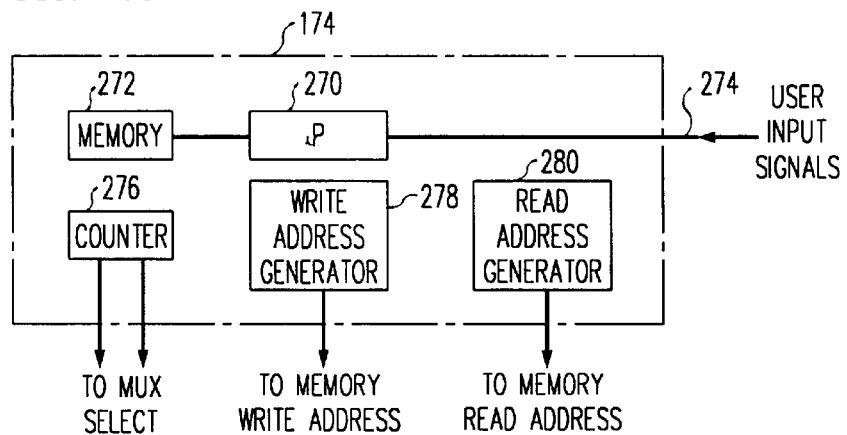
FIG. 10 is a block diagram of the controller of FIG. 7.

FIG. 10 illustrates a block diagram of controller 174. Controller 174 includes microprocessor 270 and memory 272. Memory 272 includes RAM and ROM. Processor 270 receives commands on line 274 from user input device 180. Microprocessor 270 controls start, stop and reset of counter 276. Counter 276 controls the select lines of mux 170. Counter 276 counts at a rate that is four times the horizontal scan rate of the cameras. Write address generator 278 provides write addressing for memory 172. Write address generator 278 includes a counter, register for storing offsets and adder for adding the offsets and counter output. Microprocessor 270 controls the offset selection and the counters used by write address generator 278. The write addresses are formed as described with regard to FIG. 9. Read address generator 280 provides read addresses to memory 172. Read address generator 280 includes a counter, register for storing offsets and adder for adding the offsets and counter output. As with write address generator 278, microprocessor 270 controls the offset selection and the counters of read address generator 280. Microprocessor 270 also controls the starting column used by the counters based on inputs provided on line 274 from user input 180.

The write and read addresses are provided to memory 172 separately if memory 172 is implemented using a two port memory. If memory 172 is implemented with a single port memory, the write and read addresses are multiplexed to memory 172.

Figure 11:
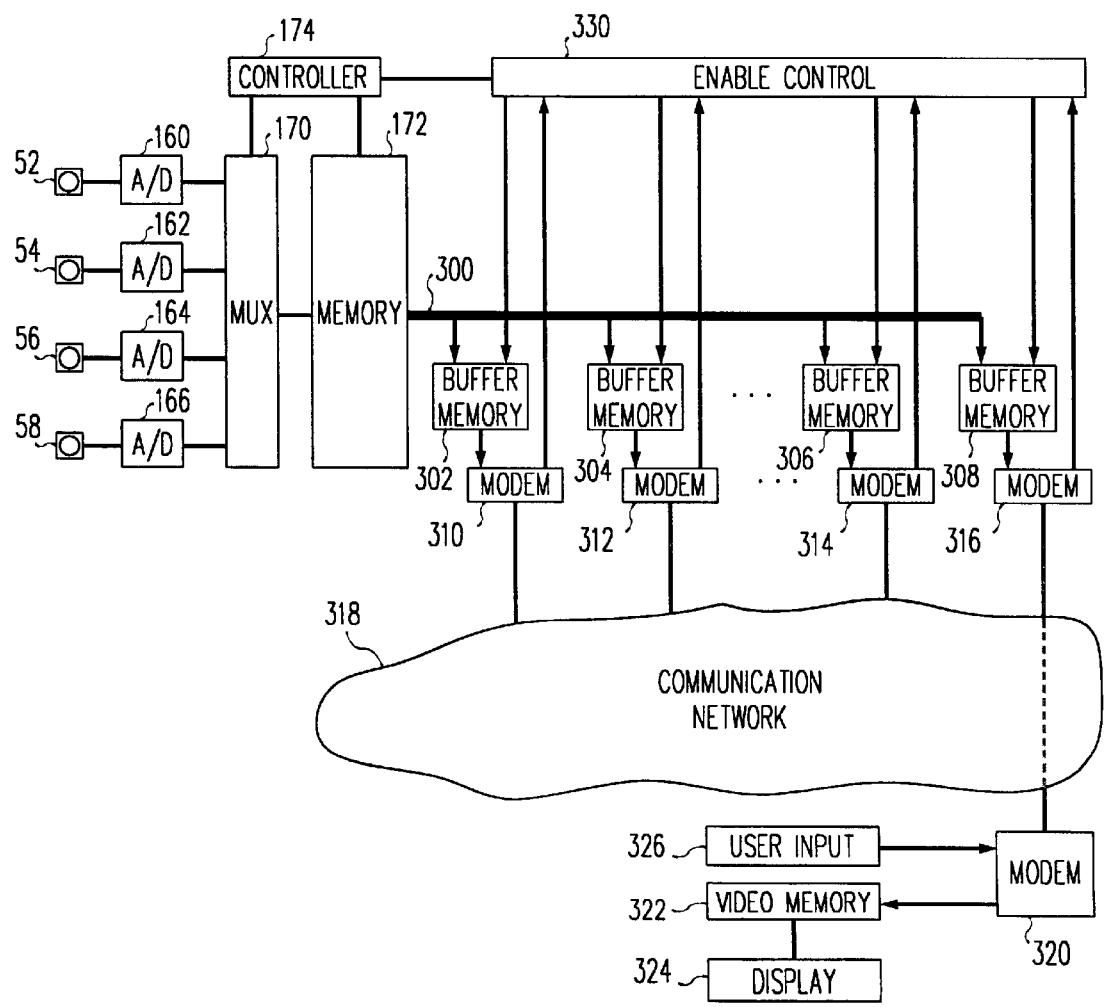
FIG. 11 illustrates using a telecommunications network to provide a selection of views to a plurality of users.

FIG. 11 illustrates an embodiment where a panoramic viewer is used to provide views to several users over a communications network. In this embodiment, all of the columns of pixel data are read from memory 172 and placed on bus 300. Buffer memories 302, 304, 306 and 308 receive the data from bus 300. The buffer memories are enabled only when desired columns are available on bus 300. The buffer memories then pass their information to modems 310, 312, 314 and 316, which then provide the pixel data to telecommunications network 318. Telecommunications network 318 then delivers the information from the modems to the users. In one example, a user receives information from modem 316 using modem 320. Modem 320 then provides the pixel information that was in memory 308 to a local video memory 322. Video memory provides the pixel information to display 324 for viewing. The user at this location controls the view using user input device 326 which may be a device such as a mouse, keyboard or joystick. Modem 320 transmits the user input device signals over telecommunications network 318 to modem 316 which then provides the signals to enable controller 330. Enable controller 330 receives a signal from controller 174 that indicates which column is being read from memory 172. When the appropriate column is available, the enable controller 330 enables the buffer memory 308 to receive the columns of data specified by the user input device signals received over the communication network. As discussed with regard to FIG. 9, enable controller 330 simply moves the start column based on signals from the user input device. In this embodiment, enable controller 330 enables the input to the buffer memory when the pixel data from the start column is on bus 300. Enable controller 330 disables the input to the buffer memory when the total number of columns of pixels to be viewed are provided to the buffer memory. FIG. 11 illustrates a system where four users can individually control their viewing; however, more users may be accommodated by simply increasing the number of buffer memories, modems, and ports on enable controller 330.

Figure 12:
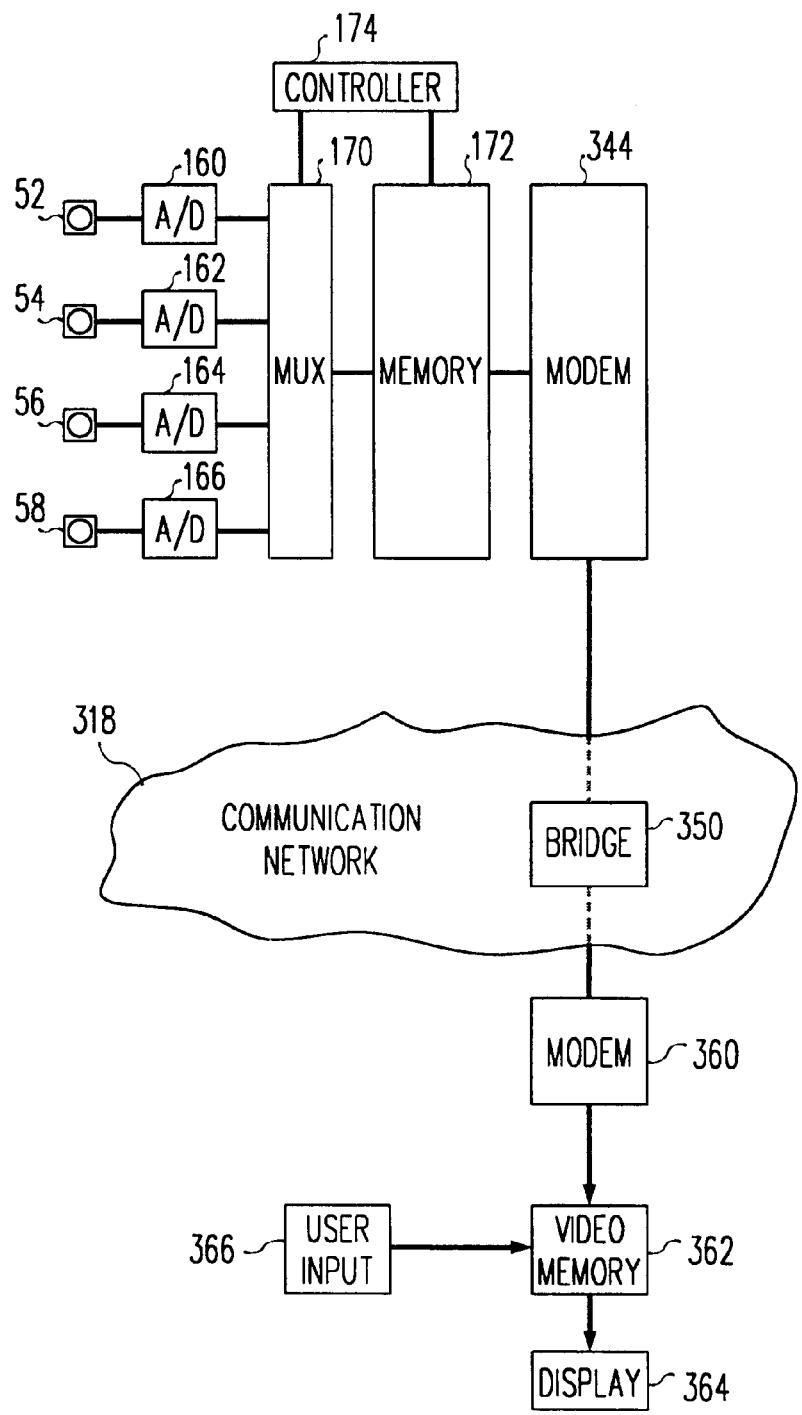
FIG. 12 illustrates a second embodiment for providing a selection of views to multiple users over a telecommunications network.

FIG. 12 illustrates another embodiment in which multiple viewers can use the panoramic viewer. As the pixel data is read from memory 172, all of the data is passed over telecommunications network 318 to telecommunications bridge 350. The information from memory 172 is provided to bridge 350 via modem 344; however, the data may be passed to bridge 350 without use of modem 344 if a digital connection is made between memory 172 and bridge 350. Bridge 350 then distributes all of the data received from memory 172 to each user in communication with bridge 350. If bridge 350 provides analog link to users, a modem should be used at each user port. If the bridge has a digital link to the user ports, a modem is not required. In the case of an analog link, the data from memory 172 passes from modem 344 via bridge 350 to modem 360 at a user port. Modem 360 passes the pixel data to video memory 362. Video memory 362 then passes the pixel information to video display 364 under control of a user via user input device 366. User input device may be a mouse, joystick or computer keyboard. In this embodiment, the entire contents of memory 172 is fed to video memory 362. The data read from memory 362 and passed to video display 364 is controlled using user input device 366 in a fashion similar to that which was described with regard to FIG. 9.

Figure 13:
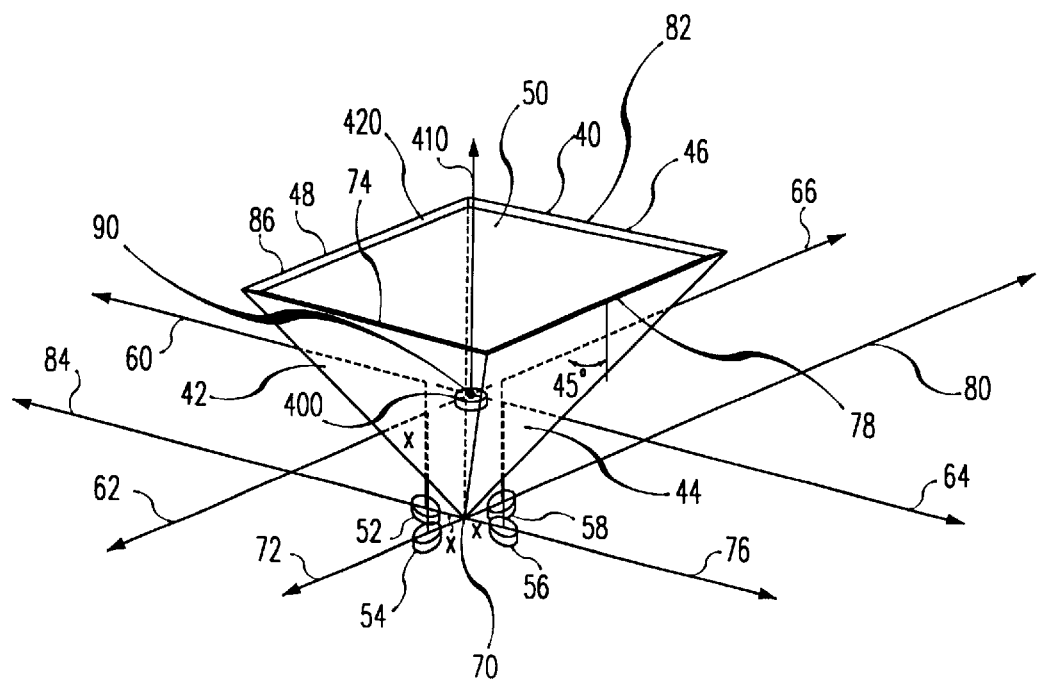
FIG. 13 illustrates the viewing system of FIG. 2 with a fifth camera.

FIG. 13 illustrates the viewing system of FIG. 2 with a fifth camera. Camera or image gathering device 400 is located in pyramid 40 with the optical center of camera 400 located at virtual optical center 90. Camera 400 views objects in the direction of arrow 410. It is desirable to provide camera 400 with a wide angle lens. The resulting wide angle view coupled with the views of the remaining four cameras, provides a nearly spherical view. If the camera of FIG. 13 are replaced with image processing devices, the nearly spherical viewing system becomes a nearly spherical projection system. It should be noted that a camera or projection device may be placed at the virtual optical center of viewing/projection devices having pyramids with three, four or more sides. It should also be noted that base edges 420 of the reflective surfaces should be beveled to avoid undesirable obstruction of camera 400's field of view. It is also possible to avoid undesirable image artifacts from base edges 420 by moving camera or image processing device 400. Device 400 should be moved so that device 400's optical center is positioned away from virtual optical center 90 in the direction of arrow 410. Device 400's optical center should be positioned so that the device's field of view does not include edges 420.

Figure 14:
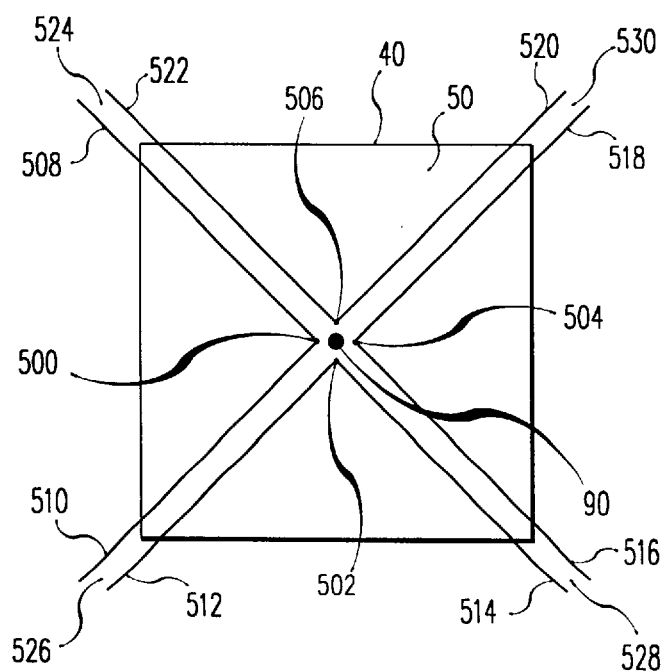
FIG. 14 illustrates a top view of the pyramid of FIG. 2 with displaced virtual optical centers.

FIG. 14 illustrates a top view of the pyramid of FIG. 2. In reference to FIG. 2, camera 52, 54, 56 and 58 have been moved upward in the direction of base 50. As a result, virtual optical centers 500, 502, 504 and 506, which correspond to cameras 52, 54, 56 and 58, respectively, are moved away from virtual optical center 90. It is desirable to move the virtual optical centers so that camera 52 captures an image between lines 508 and 510, camera 54 captures an image between lines 512 and 514, camera 56 captures an image between lines 516 and 518, and camera 58 captures an image between lines 520 and 522. This results in the cameras not capturing useful images from narrow planar shaped regions. In particular, planar regions 524, 526, 528 and 530 are not used by the cameras and form blind regions. This offers the advantage of removing portions of the cameras' fields of view that are received from the edges of the reflective pyramid. Eliminating these portions of the fields of view alleviates the need to provide image processing that compensates for image artifacts as the edges. It is desirable to keep virtual optical centers 500, 502, 504 and 506 closely clustered so that planes 524, 526, 528 and 530 are only as thin as necessary to avoid edge artifacts. By maintaining such thin planes, the need to process the images at their common boundaries is removed while minimizing the noticeable effect seen by a user.

Figure 15:
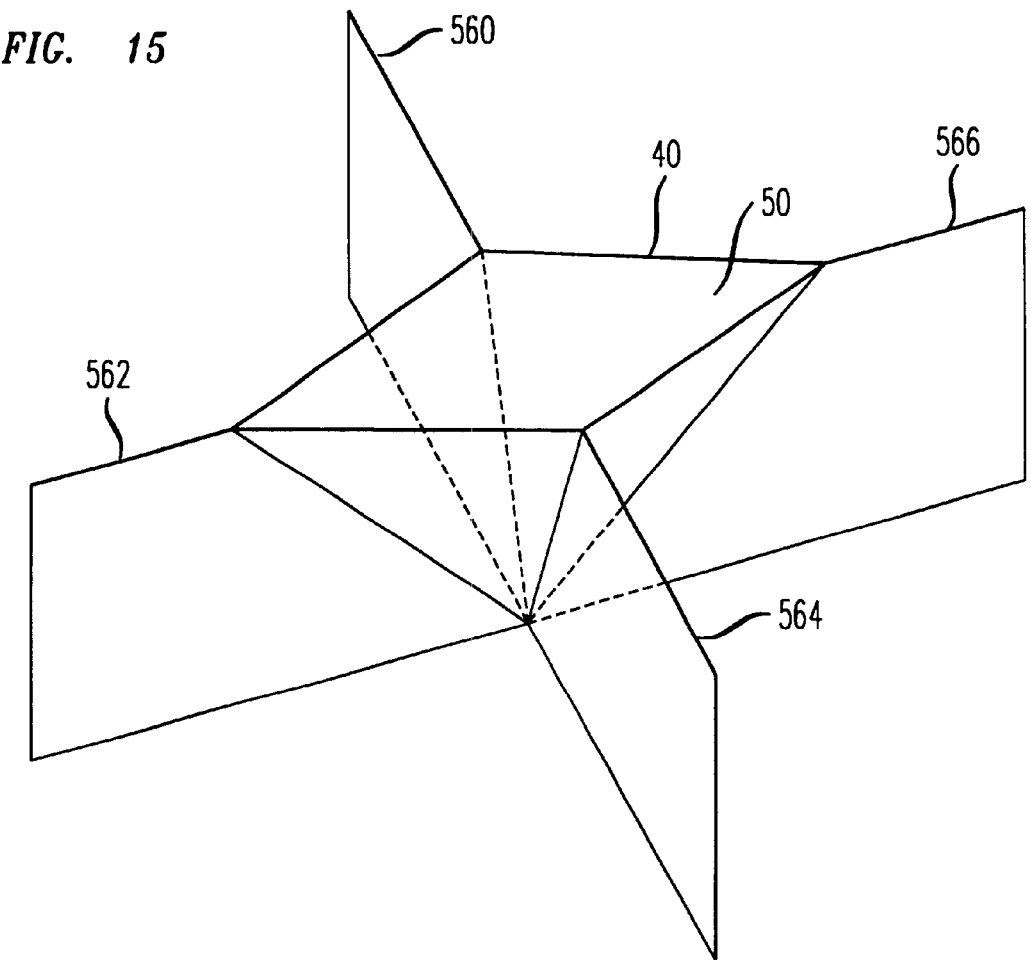
FIG. 15 illustrates the pyramid of FIG. 14 with shades positioned in blind regions.

FIG. 15 illustrates the pyramid of FIG. 14 with shades 560, 562, 564 and 566 positioned in planar regions 524, 526, 528, and 530, respectively. The shades reduce the amount of unwanted light that enters the cameras. Similar shades may be placed in blind regions between device 400's field of view and one or more of the other image processing devices' field of view. For example, if we recall that moving image device 400 in the direction of arrow 410 removes base edges 420 from the device's field of view, a shade may be placed in one or more of the planar blind regions that extend out from a base edge 420.

What is claimed is:

1. A viewing apparatus having a composite field of view, comprising:

at least two image transducers, each having an individual field of view;

a reflective element having at least one reflective area that is positioned to redirect at least part of the field of view associated with a first one of the image transducers;

at least part of the redirected field of view being merged with at least part of the field of view associated with the second one of the image transducers to produce the composite field of view of the viewing apparatus, these parts of the fields of view associated with the first and second image transducers being arranged with respect to the reflective area to create a blind region that is not in either of these two parts of the fields of view, that encompasses a portion of an edge of the reflective area, and that is located between the parts of the two fields of view associated with the first and second image transducers that produce the composite field of view.

2. The viewing apparatus of claim 1, wherein a shade is positioned in the blind region of the composite field of view, between portions of the two fields of view associated with the first and second image transducers.

3. The viewing apparatus of claim 1, wherein the reflective element has a second reflective area and at least a part of the field of view of the second image transducer is redirected by the second reflective area, and at least parts of the two redirected fields of view, each associated with one of the image transducers, are merged to produce the composite field of view of the viewing apparatus.

4. The viewing apparatus of claim 3, wherein a shade is positioned in the blind region of the composite field of view, between portions of the two fields of view associated with the first and second image transducers.

5. The viewing apparatus of claim 1, wherein the reflective element is not within the part of the field of view associated with the second one of the image transducers that is used to produce the composite image.

6. The viewing apparatus of claim 5, wherein a shade is positioned in the blind region of the composite field of view, between portions of the two fields of view associated with the first and second image transducers.

7. The viewing apparatus of claim 1, wherein the image transducers are image capture devices.

8. The viewing apparatus of claim 7, wherein a shade is positioned in the blind region of the composite field of view, between portions of the two fields of view associated with the first and second image capture devices.

9. The viewing apparatus of claim 1, wherein the image transducers are image producing devices.

10. The viewing apparatus of claim 9, wherein a shade is positioned in the blind region of the composite field of view, between portions of the two fields of view associated with the first and second image producing devices.

* * * * *